United States Patent
Babej (10) Patent No.: US 9,175,715 B2
(45) Date of Patent: Nov. 3, 2015

(54) FUNCTIONAL ELEMENT HAVING FEATURES PROVIDING SECURITY AGAINST ROTATION AND ALSO A COMPONENT ASSEMBLY CONSISTING OF THE FUNCTIONAL ELEMENT AND A SHEET METAL PART

(75) Inventor: Jiri Babej, Lich (DE)

(73) Assignee: PROFIL VERBINDUNGSTECHNIK GMBH & CO. KG, Friedrichsdorf (DE)

( * ) Notice: Subject to any disclaimer, the term of this patent is extended or adjusted under 35 U.S.C. 154(b) by 60 days.

(21) Appl. No.: 13/547,180

(22) Filed: Jul. 12, 2012

(65) Prior Publication Data

US 2013/0022782 A1  Jan. 24, 2013

(30) Foreign Application Priority Data

Jul. 21, 2011  (DE) .......................... 10 2011 108 224

(51) Int. Cl.
| | | |
|---|---|---|
| *B32B 3/30* | (2006.01) | |
| *F16B 17/00* | (2006.01) | |
| *F16B 19/00* | (2006.01) | |
| *F16B 19/04* | (2006.01) | |
| *F16B 19/06* | (2006.01) | |
| *F16B 19/08* | (2006.01) | |
| *F16B 21/00* | (2006.01) | |
| *F16B 39/282* | (2006.01) | |

(Continued)

(52) U.S. Cl.
CPC ............... *F16B 37/068* (2013.01); *F16B 19/00* (2013.01); *F16B 17/006* (2013.01); *F16B 19/04* (2013.01); *F16B 19/06* (2013.01); *F16B 19/08* (2013.01); *F16B 21/00* (2013.01); *F16B 39/282* (2013.01); *Y10T 428/24273* (2015.01)

(58) Field of Classification Search
CPC ............. F16B 37/064; B21K 1/50; B21K 1/54
See application file for complete search history.

(56) References Cited

U.S. PATENT DOCUMENTS 2,037,586 A * 4/1936 Olson .......................... 411/188
2,056,688 A * 10/1936 Peterka et al. ................ 411/399

(Continued)

FOREIGN PATENT DOCUMENTS

DE  2556985 A1 * 6/1977 ............ F16B 39/282
DE  3641836 A1 * 6/1988 ............ F16B 39/282

(Continued)

OTHER PUBLICATIONS

Machine Translation of JP 10318237 A, Dec. 1998.*

(Continued)

*Primary Examiner* — Jeff Vonch
(74) *Attorney, Agent, or Firm* — Hershkovitz & Associates, PLLC; Abraham Hershkovitz; Eugene Rzucidlo (57) ABSTRACT

A functional element having a shaft part and a head part has at least one feature providing security against rotation which is provided in the region of a sheet metal contact surface of the functional element. The functional element is characterized in that each feature providing security against rotation comprises a recess provided in the sheet metal contact surface of the functional element with a raised portion disposed at least substantially centrally in the recess or with a raised portion surrounding the recess. With this design the functional element can be straightforwardly be inserted in a thick sheet metal part or in a sheet metal part of higher strength and thus a security against rotation of high quality can be achieved.

9 Claims, 4 Drawing Sheets

(51) Int. Cl.
*F16B 37/06* (2006.01)
*F16B 19/10* (2006.01)

(56) References Cited

U.S. PATENT DOCUMENTS

| | | | | |
|---|---|---|---|---|
| 2,096,041 A * | 10/1937 | Hosking | | 411/187 |
| 2,112,494 A * | 3/1938 | Olson | | 411/187 |
| 2,128,757 A * | 8/1938 | Olson | | 411/187 |
| 2,179,575 A * | 11/1939 | Hosking | | 411/162 |
| 2,322,811 A * | 6/1943 | Ball | | 411/378 |
| 2,982,166 A * | 5/1961 | Hobbs | | 411/399 |
| 3,120,254 A * | 2/1964 | Waltermire et al. | | 411/188 |
| 3,127,919 A * | 4/1964 | Swanstrom | | 411/188 |
| 3,213,914 A | 10/1965 | Baumle et al. | | |
| 3,253,631 A * | 5/1966 | Reusser | | 411/179 |
| 3,299,500 A * | 1/1967 | Double | | 29/432.2 |
| 3,403,717 A * | 10/1968 | Lemelson | | 411/143 |
| 3,750,525 A * | 8/1973 | Waters et al. | | 411/34 |
| 3,770,037 A * | 11/1973 | Ernest | | 411/184 |
| 3,785,420 A * | 1/1974 | Bradley et al. | | 411/188 |
| 3,910,331 A * | 10/1975 | Randall | | 411/181 |
| 3,958,389 A * | 5/1976 | Whiteside et al. | | 403/279 |
| 3,967,669 A * | 7/1976 | Egner | | 411/184 |
| 4,289,181 A * | 9/1981 | Capuano | | 411/187 |
| 4,357,746 A * | 11/1982 | Kytta | | 29/509 |
| 4,380,414 A * | 4/1983 | Capuano | | 411/187 |
| 4,432,681 A * | 2/1984 | Capuano | | 411/188 |
| 4,470,736 A * | 9/1984 | Tasseron | | 411/404 |
| 4,543,023 A * | 9/1985 | Capuano | | 411/180 |
| 4,627,776 A * | 12/1986 | Pamer et al. | | 411/179 |
| 4,637,766 A * | 1/1987 | Milliser | | 411/180 |
| 4,726,164 A * | 2/1988 | Reinwall et al. | | 52/410 |
| 4,779,326 A * | 10/1988 | Ichikawa | | 29/520 |
| 4,820,076 A * | 4/1989 | Rossigno | | 403/284 |
| 4,927,756 A * | 5/1990 | Schwengers | | 435/103 |
| 4,966,512 A * | 10/1990 | Takaku | | 411/181 |
| 5,340,251 A * | 8/1994 | Takahashi et al. | | 411/179 |
| D368,019 S * | 3/1996 | Ohtsuka | | D8/387 |
| 5,513,933 A * | 5/1996 | Rom | | 411/180 |
| 5,528,812 A * | 6/1996 | Muller | | 29/432.2 |
| 5,797,175 A * | 8/1998 | Schneider | | 29/520 |
| 6,125,524 A * | 10/2000 | Mueller | | 29/520 |
| 6,220,804 B1 * | 4/2001 | Pamer et al. | | 411/180 |
| 6,318,940 B1 * | 11/2001 | Mitts | | 411/188 |
| 6,592,311 B2 * | 7/2003 | Wojciechowski et al. | | 411/107 |
| 6,817,815 B2 * | 11/2004 | Ross | | 411/180 |
| 6,851,904 B2 * | 2/2005 | Parker et al. | | 411/180 |
| 7,112,142 B2 | 9/2006 | Wojciechowski et al. | | |
| 7,258,517 B2 * | 8/2007 | Ross et al. | | 411/180 |
| 7,258,518 B2 * | 8/2007 | Ward et al. | | 411/180 |
| 7,401,394 B1 * | 7/2008 | Muller | | 29/432.1 |
| 7,591,623 B2 | 9/2009 | Parker | | |
| 7,815,406 B2 * | 10/2010 | Babej et al. | | 411/181 |
| 8,142,125 B2 | 3/2012 | Vrana et al. | | |
| 8,156,631 B2 * | 4/2012 | Schmidt | | 29/524.1 |
| 2004/0234357 A1 | 11/2004 | Wojciechowski et al. | | |
| 2006/0137166 A1 * | 6/2006 | Babej et al. | | 29/509 |
| 2007/0258788 A1 * | 11/2007 | Gardstam | | 411/176 |
| 2007/0297870 A1 * | 12/2007 | Vrana et al. | | 411/180 |
| 2008/0019800 A1 * | 1/2008 | Liu | | 411/531 |
| 2009/0028662 A1 * | 1/2009 | Babej | | 411/180 |
| 2009/0196678 A1 * | 8/2009 | Babej et al. | | 403/19 |
| 2010/0074712 A1 * | 3/2010 | Shinjo | | 411/337 |
| 2012/0308329 A1 * | 12/2012 | Babej et al. | | 411/166 |

FOREIGN PATENT DOCUMENTS

| | | | | |
|---|---|---|---|---|
| DE | 3704763 C1 * | 10/1988 | | F16B 35/06 |
| DE | 4137020 A1 * | 5/1993 | | F16B 39/282 |
| DE | 195 35 537 A1 | 3/1997 | | |
| DE | 19734539 A1 * | 2/1999 | | F16B 19/04 |
| DE | 10 2007 024 494 A1 | 10/2008 | | |
| EP | 0 842 733 A2 | 5/1998 | | |
| EP | 1 674 741 A1 | 6/2006 | | |
| EP | 2141370 A1 * | 1/2010 | | F16B 37/06 |
| JP | 07279937 A * | 10/1995 | | F16B 39/282 |
| JP | 09170616 A * | 6/1997 | | F16B 35/00 |
| JP | 09317746 A * | 12/1997 | | F16B 39/282 |
| JP | 10318237 A * | 12/1998 | | F16B 39/282 |

OTHER PUBLICATIONS

German Search Report in corresponding German Patent Application No. 10 2011 108 224.0 dated May 10, 2012.

English language translation of Germna Search Report in corresponding German Patent Application No. 10 2011 108 224.0 dated May 10, 2012.

English Abstract for EP 0 842 733 A2.

* cited by examiner

FUNCTIONAL ELEMENT HAVING FEATURES PROVIDING SECURITY AGAINST ROTATION AND ALSO A COMPONENT ASSEMBLY CONSISTING OF THE FUNCTIONAL ELEMENT AND A SHEET METAL PART

FIELD OF THE INVENTION

The present invention relates to a functional element having features providing security against rotation and also to a component assembly consisting of a functional element and a sheet metal part.

BACKGROUND OF THE INVENTION

A functional element and also a component assembly of this kind are known from EP-A-1674741. There an element is claimed which can be attached by riveting to a sheet metal part or in particular an element in the form of a centering bolt. The element is provided with a shaft part and a head part, with the head part having an at least substantially ring-like ring recess at its side confronting the sheet metal part, with the ring recess merging at its radially inner side into a cylindrical section of the head part, which in turn merges into the shaft part and into a tubular rivet section. The tubular rivet section surrounds the shaft part in the region of the head part, is arranged within a ring-like contact surface arranged radially outside of the ring recess and merges at the radially outer side via an at least substantially conical wall into the ring-like contact surface.

SUMMARY OF THE INVENTION

To provide security against rotation a plurality of local recesses, in particularly uniformly distributed recesses, are provided in the conical wall of the ring recess and/or in an optionally present ring-like base surface (26) of the ring recess.

The element is in particular intended for use with thick sheet metal parts. Other elements are also known in which recesses are provided in a sheet metal contact surface to achieve a security against rotation. In practice, the functional element is pressed in a press or by the use of a robot or a force-actuated caliper against a sheet metal part, with the press of the robot or of the caliper exerting an axial force on the head part of the functional element on the one side of the sheet metal part and also on a die button on the other side of the sheet metal part, in order to rivet the functional element to the sheet metal part by beading over the rivet section. Functional elements are also known in the form of press-in elements and also the functional elements is at least substantially not intentionally deformed by the press, the robot or the caliper but rather the sheet metal material is forced to flow into an undercut of the functional element during the pressing in of the element.

At this point it should be brought that the present invention can be used with a broad spectrum of functional elements such as rivet elements, piercing and riveting elements, press-in elements and piercing elements, with the functional element be able to be provided with an internal thread and/or and external thread, i.e. it can be formed as a nut element or as a bolt element, or can be formed as a bearing spigot or a bearing sleeve or as a hollow bearing for a shaft. On the other hand, the functional elements can also be realized as a clip.

Irrespective of which purpose it is intended it proves difficult to deform the sheet metal material by means of a die button so that the sheet metal material flows into the recesses and generates the required security against rotation between the functional element and the sheet metal part.

The problem is particularly acute with thick sheet metal parts (but is also relevant with thin sheet metal parts and sheet metal parts of high strength) because it is not easy to cause the sheet metal material to flow by means of the die button so that it fully or adequately fills the recesses in order to achieve the required security against rotation in this manner.

Vice-versa it is sometimes difficult to press projections providing security against rotation, such as ribs providing security against rotation adequately into the sheet metal material at the sheet metal contact surface and to hereby achieve the desired security against rotation.

The object of the present invention is to provide assistance here.

In order to satisfy this task, provision is made in accordance with the invention that each feature providing security against rotation comprises a recess provided in the sheet metal contact surface of the functional element with a raised portion disposed at least substantially centrally in the recess or with a raised portion surrounding the recess.

Since a local raised portion and a local recess are arranged directly adjacent to one another, the local base portion only has to displace the sheet metal material over a short path to bring it into the local recess and this can be done relatively simply and with medium forces even when thicker sheet metal parts of several mm thickness or higher strength or high strength sheet metals are used with strengths above 300 MPa and 1400 MPa respectively. A reason for this may lie in the fact that the press force which is applied leads to a locally elevated stress which facilitates the displacement of sheet metal into the direct or adjacent recess.

If, in contrast, with local raised portions providing security against rotation, the displaced material must be distributed in a surrounding volume of solid and in principle incompressible material. If only local recesses providing security against rotation used then material must be displaced from a large volume of sheet metal material into the recesses, which likewise requires relatively high forces.

It is particularly favorable when the sheet metal contact surface lies in a local plane in the vicinity of the feature providing security against rotation and around the latter or determines a corresponding plane and when the volume of the raised portion above this local plane corresponds at least substantially to the volume of the recess beneath this plane. This local plane can, in the case of a raised portion which lies centrally in a recess, be understand as the plane which is determined by the outer boundary of the recess. However, it can also be the case that the recess lies at least partly in a rounded surface, for example in a conical surface, whereby the boundary does not really lie in a plane as a result of the curvature or of the surface or a possible angle of the surface and the extent of the boundary. In such a case one can however define a type of medium plane which can be used for the consideration of the volumes.

In this way it can also be ensured that the sheet metal material, which is locally displaced by the raised portion providing security against rotation, is also completely received in a directly adjacent recess providing security against rotation, whereby the desired form-fitting engagement between the features providing security against rotation and the sheet metal part is maximized, and thus a good security against rotation arises.

In this connection the tip of the raised portion is preferably rounded. In this way it is ensured that no undesired notch action arises which would be detrimental for the fatigue life of the component assembly. In the same reason it is preferred when the boundary of the recess is rounded. Here however, the notch action is not so critical, because the sheet metal part has at least substantially the original thickness at this point, so that the said boundary can also be made sharp-edged.

The functional element can have a rivet section which secures the form-fitted engagement of each of the functional element providing security against rotation with the sheet metal part.

Alternatively to this, the functional element can be a press-in element with an undercut receiving sheet metal material, which likewise secures the form-fitted engagement of each feature of the functional element providing security against rotation in the sheet metal part.

Furthermore, the present invention is concerned with a component assembly consisting of a functional element as explained above and the sheet metal part, with the sheet metal material having a material recess adjacent to the sheet metal contact surface at the position of each raised portion of a feature providing security against rotation and a raised material portion at the position of each recess, whereby a form-fitted engagement between the material of the sheet metal part and the functional element exists which brings about the security against rotation.

When the functional element is a rivet element having a rivet section, the rivet section, after the beading over, clamps the sheet metal material between itself the sheet metal contact surface whereby a high-quality component assembly arises which has a good security against rotation.

When the functional element is a press-in element and the undercut at least partly receives the sheet metal material, then this prevents an axial separation of the functional element and the sheet metal part. In this form the form-fitted engagement between the raised portion of the feature of the functional element providing security against rotation and the material recess of the sheet metal part and also between the recess of the functional element and the raised material portion of the sheet metal part is maintained.

BRIEF DESCRIPTION OF THE FIGURES

The invention will now be explained in more detail purely by why of example and with reference to an embodiment and to the drawings in which are shown.

DETAILED DESCRIPTION OF THE INVENTION

The functional element 12 of FIGS. 1A to 1D corresponds extensively to the functional element of EP-B-1674741 except that the features providing security against rotation, which are generally characterized with the reference numeral 32 are formed differently.

With reference to FIGS. 1A to 1D and FIGS. 2A to 2C an element 12, which can be attached to the sheet metal part 10 (FIGS. 2A to 2C) by riveting is shown in the form of a centering bolt having a shaft part 14 and a head part 16. The head part 16 has an at least substantially ring-like ring recess 20 at its side 18 confronting the sheet metal part 10, with the ring recess merging at the radially inner side into a cylindrical section 21 of the head part 16 which in turn merges into the shaft part 14 and into a tubular rivet section 22 which surrounds the shaft part 14 in the region of the head part 16 or directly beneath the head part 16. The ring recess 20, which forms a sheet metal contact surface, is arranged inside a further ring-shaped radial contact surface 24 outside of the ring recess 20, or is arranged within a contact surface consisting of circular ring segments 24', and merges at the radially outer side via an at least substantially conical wall 23 into the contact surface 24 or 24'. The conical wall 23 can advantageously an enclosed cone angle in relation to a horizontal plane of approximately 33° as shown. This angle can be selected without restriction in the range of 20° to 45° and these values are also not to be regarded as restrictive. The recess 20 is also not essentially required but rather could also be replaced by a surface standing perpendicular to the longitudinal axis 30 which also forms a contact surface 24.

Radially within the conical wall 23 the ring recess 20 has, in this example, a base surface 26 which is of curved ring shape in half cross-section and which merges in the radially outer surface of the cylinder section 21. In this example the base surface 26, which is curved in the radial half-section, includes a flat section 28 which stands at least substantially perpendicular to the central longitudinal axis 30 of the element 12. It would however also be conceivable to omit the flat base surface or to expand the radial width of the flat portion 28 so that it merges directly or via a relatively small radius into the conical wall 23 or into the cylinder section 21 above the rivet section 22 (not shown). The base surface could also be realized otherwise or by a relative sharp transition of a conical wall into the cylinder section 21 above the rivet section 22 (whereby the designation "above" is to be understood for the orientation of the element 12 which is shown in FIG. 1B and not as a geometrical definition).

At least one local feature 32 providing security against rotation or preferably a plurality of local features providing security against rotation, in particular uniformly distributed local features providing security against rotation 32 is or are provided in the conical wall 23 of the ring recess 20 and/or in the optionally provided ring-shaped base surface 26 of the ring recess 20. Furthermore, the features 32 providing security against rotation extend in this example on the ring-like contact surface 24 and subdivide this into the named sectors or circular ring segments 24'.

Each feature 32 providing security against rotation consists in this example of a recess 31 provided in a sheet metal contact surface of a functional element 12 having a raised portion 33 arranged at least substantially centrally in the recess or surrounding the recess.

Since a local raised portion 33 and a local recess 31 are arranged directly adjacent to one another, the sheet metal material only has to be displaced over a short path on attaching the element to a sheet metal part 10 in order to bring it into the directly adjacent local recess 31 and this is achieved relatively simply and with moderate forces even if one is using thick sheet metal parts of several mm thickness or working with higher strength or high strength sheet metals with strengths above 300 MPa and 1400 MPs respectively.

It is particularly favorable when the sheet metal contact surface (here formed by the surfaces 26, 23 and 24) in the region of features providing security against rotation and around the latter lie in a local plane E (FIG. 3C) or determine a corresponding plane and the volume of the raised portion 33 above this local plane corresponds at least substantially to the volume of the recess 31 below this plane.

In this way it is ensured that the sheet metal material which is locally displaced by the raised portion 32 providing security against rotation is also fully received in the directly adjacent recess 31 providing security against rotation, whereby the desired form-fitted engagement between the features 32 providing security against rotation and the sheet metal part 10 and thus a good security against rotation arises.

Figure 1A:
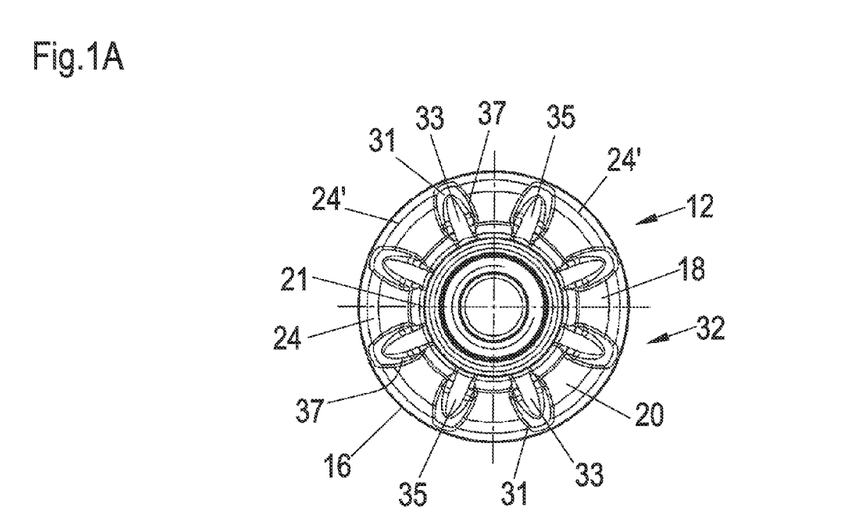
FIG. 1A a plane view of the sheet metal contact surface of the functional element in accordance with the invention in the form of a threaded bolt, FIG. 1B a view of the threaded bolt of FIG. 1A partly sectioned in the longitudinal direction, FIG. 1C an enlarged representation of the encircled region of the representation of FIG. 1B, FIG. 1D a perspective illustration of the threaded bolt of FIGS. 1A to 1C, FIG. 2A-2C representations in order to explain the installation of a threaded bolt in accordance with FIGS. 1A to 1D into a sheet metal part to generate the component assembly in accordance with the invention, FIG. 3A a functional element in accordance with the invention in the form of a nut element having an alternative form of the features providing security against rotation, FIG. 3B an enlarged representation of a feature providing security against rotation in accordance with FIG. 3A as seen from below in plane view, and FIG. 3C an enlarged representation of a feature providing security against rotation in accordance with FIG. 3A seen in a radial section plane (radial to the longitudinal axis of the element).
Figures 1B, 1C:
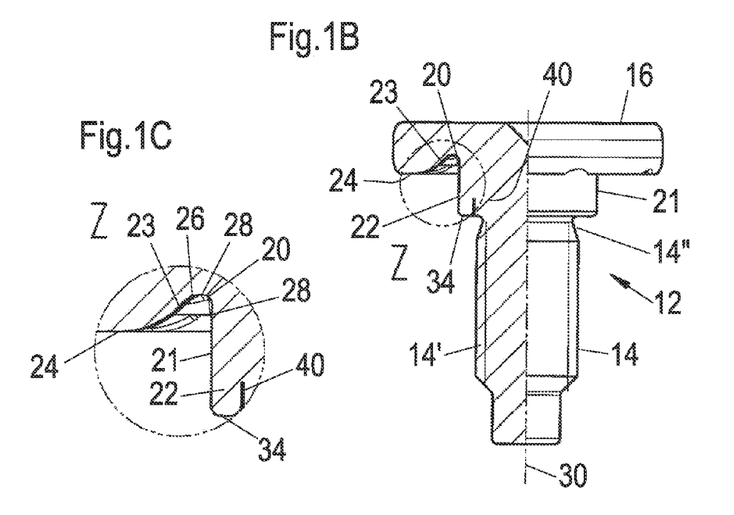
Figure 1D:
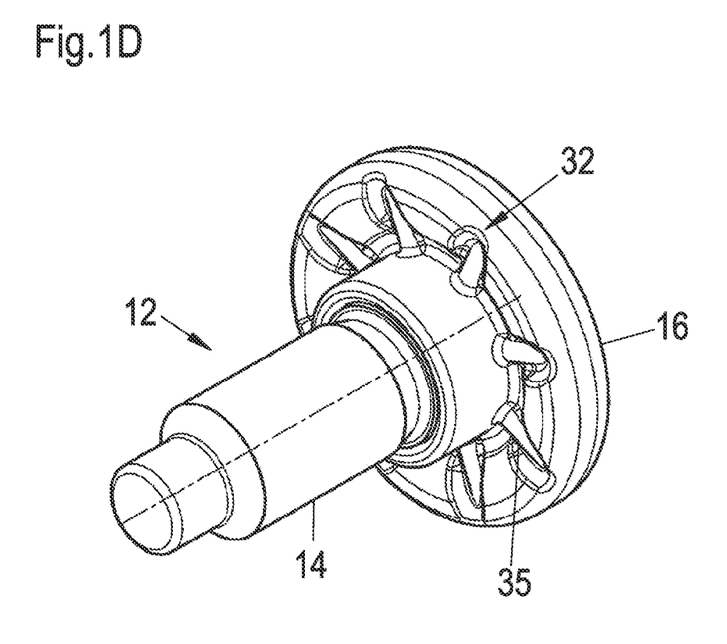

In this connection, the tip 35 of the raised portion 33 is preferably rounded as shown in FIGS. 1A and 1D. In this way it is ensured that no undesired notches arises in the sheet material 10 which would be detrimental to the fatigue life of the component assembly. For the same reason it is preferred whether the boundary 37 of the recess 31 is rounded, as is likewise evident in FIG. 1A. Here however, the notch action is not so critical so that the sheet metal part 10 after attachment of the functional element, which remains to be described in detail, has at this point at least substantially the original thickness so that the main boundary can also be executed with sharp edges.

The local recess 31 or each local recess has an elongate rounded shape, with the transition from the sidewalls of the or each local recess 31, i.e. the boundary of each recess 31 is rounded in this example, as shown at 37.

The or each local recess 31 is made sufficiently long in this example extends into the ring-like contact surface 24, whereby the ring-like contact surface 24 is also split up by the elongate recesses into circular ring segments 24'. The designation "ring-like contact surface" should thus be understood in such way that it also covers a contact surface assembled from circular ring segments which is interrupted by such local recesses. It is, however, also possible to make the local recesses shorter so that they do not reach the contact surface 24 and do not subdivide this.

Precisely in the same manner as the local elongate recesses 31 subdivide the ring-like contact surface 24, in this example the local elongate recesses 31 also subdivide the base surface 26 of the ring recess 20. When this base surface 26 is ring-like, then one understands by this that it also includes a base surface which is interrupted by one local recess or by a plurality of local recesses. The raised portions 33 of the individual features providing security against rotation are also elongate in this example and have the form of ribs providing security against rotation. These ribs adjoin the cylindrical part 21 of the head parts 6 at their radially inner ends, so that there the corresponding recess 31 is only present on both sides of the raised portion and, so to say, surround the raised portion in the manner of a horse shoe, with the radially outer end of the rib or of the raised portion 311 and with the outer end of the recess 33 being rounded.

In this example eight uniformly distributed features 32 providing security against rotation are provided. However, a different number of features 32 providing security against rotation can also be provided—from one local feature providing security against rotation up to twelve local features providing security against rotation would be completely conceivable. A larger number could also possibly be considered, above all if they are made smaller or narrower and less deep.

As is evident from this drawings, and in particular from FIG. 1C, the free end 34 of the wall of the tubular rivet section is rounded both at its radial outer side and also radial inner side when viewed in a radial section plane (as shown on the left hand side of FIG. 1B), and has for example a semicircular or arrow tip-like shape, whereby a ring apex arises at the lower end of the rivet section precisely at the point which is marked by 34.

In the embodiment in accordance with FIGS. 1A-1D the shaft part 14 is formed beneath or within the rivet section 22 as a massive or tubular central part. Instead of forming the element as a pure centering element it can also be formed as a centering element and fastener element or as a pure bolt element. In the embodiment of FIGS. 1A to 1D the shaft part 14 is provided with a thread 14'.

The thread 14' has a thread run out 14" adjacent to the region of the free end of the tubular rivet section and the thread run out merges into a cylindrical section 40 with a diameter which is the same size or larger than the outer diameter of the thread. The cylindrical section 40 which forms the actual central section essentially only then is evident when the element 12 is attached to a sheet metal part 10, as shown in FIG. 2C. In the embodiment of FIGS. 1A to 1D or FIG. 2C either the entire shaft part 14 beneath the turned-over rivet section, i.e. the rivet bead 42, forms the centering section 40, or only a part directly below the rivet bead 42. The remaining part is optionally stepped or chamfered, i.e. can be provided with a smaller diameter for the pre-centering.

Various possibilities exist of altering the elements in accordance with FIGS. 1A to 1D. For example, the head part 14 can have, at the side opposite to the shaft part a functional section, for example in the form of an external thread, an internal thread, a further shaft part with a reception of a clip or a guide part. As a further alternative the shaft part 14 could be made hollow and either serve as a guide for a pin or a shaft or be executed with an internal thread and thus form a nut element.

The method for the attachment of the element 12 of FIG. 1A to 1D to a sheet metal part 10 will now be described with reference to FIGS. 2A to 2C.

Figure 2A:
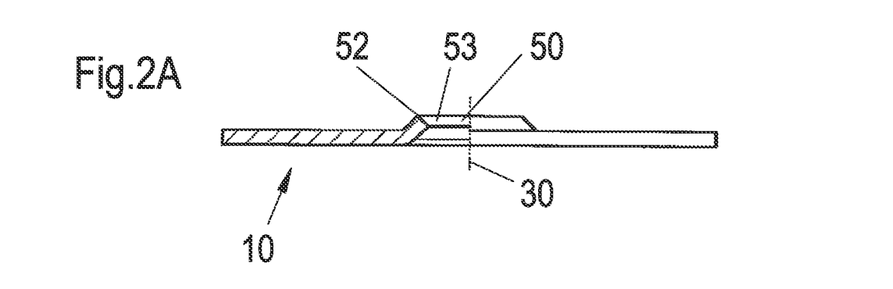
Figure 2B:
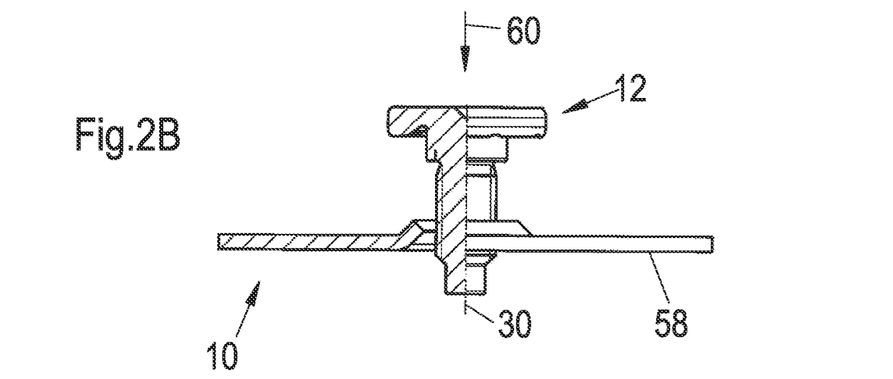
Figure 2C:
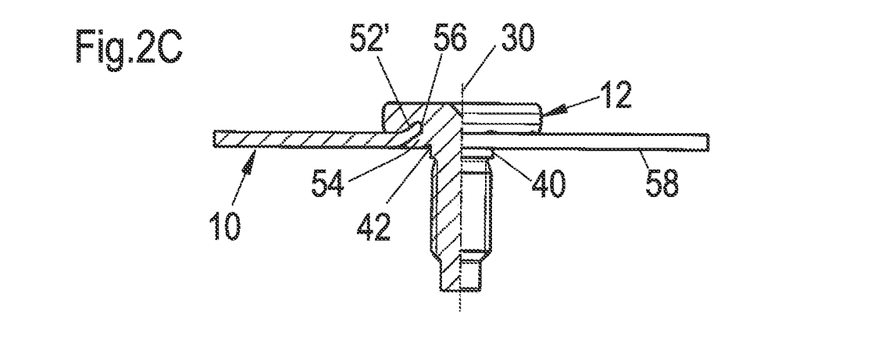

As shown in FIG. 2A the sheet metal part is inserted in the form of a holed sheet metal part 10 which has been preformed to a ring collar, i.e. to a raised portion 52 in the region of the hole 50, with the ring collar being at least substantially to the shape of the conical wall 23 of the ring recess 20. In this example the raised portion 52 of the sheet metal part is not flattened off at the top and the hole 50 was generated prior to the formation of the raised portion by a piercing process, which is why the sidewall 53 of the hole 50 extends obliquely to the longitudinal axis 30, i.e. diverges upwardly in FIG. 2A. The ring collar 52 can be flattened off at the top, i.e. the conical raised portion 52 could straightforwardly be formed with a flattened portion at the top. The piercing of the hole 50 could then be combined with flattening at the end of the pressing process for the formation of the hole 50, whereby the wall of the hole extends parallel to the longitudinal axis 30. As a further alternative the raised portion can have a steeper conical shape than the conical wall 23 of the ring recess 20.

The attachment of the element at the sheet metal part 10 then takes place in known manner by means of a die button in a press or in a C-frame.

In this connection pressure is exerted, for example in the arrow direction 60, onto the head part 16 of the element while the sheet metal part 10 is supported by non-illustrated die button. FIG. 2B shows in an intermediate state of the attachment of the functional element of the sheet metal part after the free end of the shaft part 14 has been passed through the hole 50, whereas the FIG. 2C shows the final state in which the corresponding component assembly comprising the functional element 12 and the sheet metal part 10 has been finished. In this connection the riveting of the functional element 12 to the sheet metal part 10 is effected by means of a die button (not shown) which is arranged beneath the sheet metal part. For this purpose, the die button has a central cut-out or a central bore which receives the shaft part and a ring-like raised portion surrounding the cut-out or the bore which presses the sheet metal material around the rivet section 22 against the features 32 providing security against rotation, whereby the raised portions 31 are pressed into the sheet metal material and the displaced material flows into the corresponding recesses 31.

During the formation of the rivet bead 42 (FIG. 2C) the rivet section 22 is laid into the ring recess 54 which is simultaneously formed in the lower side of the sheet metal part 10.

For this purpose the ring-like raised portion of the die button is formed at its free end preferably with a ring edge which merges into a rounded forming surface disposed radially outside the ring edge. The diameter of the ring edge is made somewhat smaller than the diameter of the ring apex in at the free end of the rivet section 22, whereby the rivet section 22 is turned radially outwardly during the riveting process by the ring edge and by the rounded forming surface and formed into the rivet bead 42. In this connection the sheet metal material is squeezed by the forces exerted between the head part 16 of the element 12 and the die button, by the rivet bead which is being formed and by the region of the die button radially outside of the rivet bead 42, so that the sheet metal material flows under the action of the stress in the region of the raised portions 33 into the local recesses 31. Thus recesses are formed in the sheet metal material and the positions of the raised portions 33 and projections are formed in the sheet metal material in the positions of the recesses 31 which lead to an interlocking arrangement between the element 12 and the sheet metal part 10 which provides security against rotation. Through the beading over of the rivet section the sheet metal material is, however, also clamped in a radial groove 56 formed between the ring recess 20 and the rivet bead 42 which secures the element in the axial direction in a sheet metal part 56. Through the squeezing forces (and the simultaneously arising expansion of the rivet section 22) the sheet metal material is moreover firmly pressed against the shaft part 14 of the element 12 in the region above the rivet bead 42, whereby a high hole friction (strangle hold) arises, which generates a firm positioning of the element and an increased security against rotation. Moreover, the sheet metal material is set in compression so that in dynamic operation no fatigue cracks are to be feared. This action can be enhanced when the conical raising of the sheet metal is partly pressed flat, i.e. when the clamping hole riveting process in accordance with the initially named EP-A-0 539 793 is used.

The result of the method is thus a component assembly consisting of the sheet metal part 10 and the element 12 attached thereto, with the sheet metal part 10 having a ring-like raised portion 52' in the region of the recess 20 which is received in form-fitted manner in the ring recess 20. The material of the sheet metal part likewise engages in form-fitted manner into each of the features 33 providing security against rotation which are respectively formed by a raised portion 33 and a recess 31. Furthermore, the ring recess 54 lies on the side 58 of the sheet metal part 10 remote from the ring recess 20, with the rivet section 22 which has been beaded over from the rivet bead 42 lying in the ring recess 54. The rivet bead 42 remote from the head part 16 does not project, or at least does not substantially project beyond the side 58 of the sheet metal part 50 in the region around the rivet bead 42 and is preferably slightly set back relative to this, for example by 0.02 mm.

For the sake of completeness it should be pointed out that the element 12 in accordance with the invention does not necessarily have to satisfy a centering function but rather it can have a pure attachment function or journaling function and it does not therefore have to be a centering element or a centering bolt.

Figure 3A:
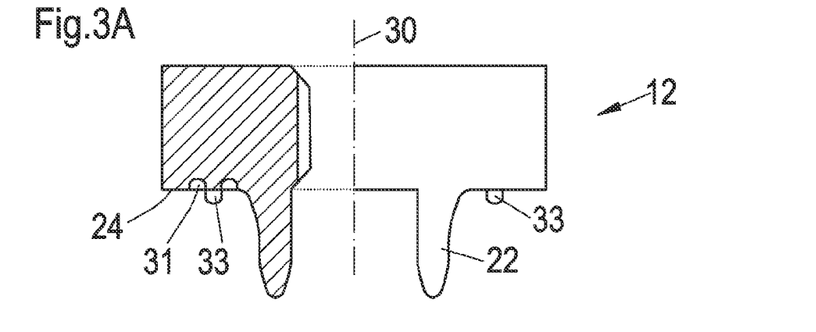
Figure 3B:
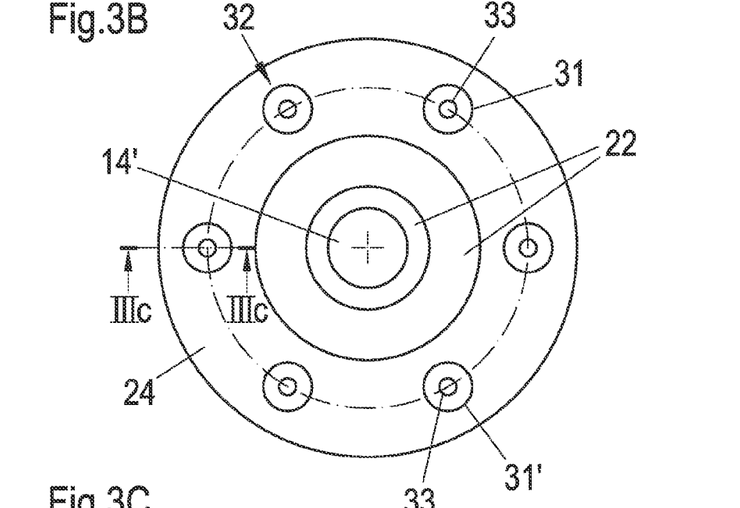
Figure 3C:
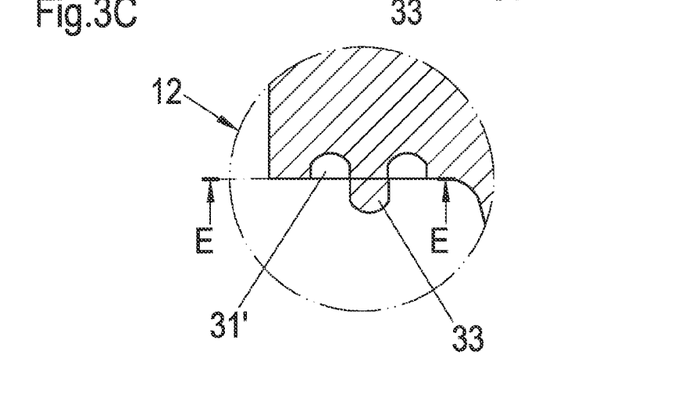

The FIGS. 3A to 3C show a functional element 12 in accordance with the invention in the form of a nut element in which the sheet metal contact surface 20 stands in a plane perpendicular to the central longitudinal axis 30. In this example the same reference numerals are used for the individual features of the nut element as are used for the previous embodiments. It will be understood that the previous description of the individual features or their function also applies for the corresponding features of FIGS. 3A to 3C unless something to the contrary is stated.

In this example six features 32 providing security against rotation are uniformly distributed around the central longitudinal axis, with both the portion 33 and also the recess are concentric to it being circularly round or circularly shape in plane view.

In all embodiments all materials can be named as examples for the material of the element which achieve the strength values of the class 8 in accordance with the ISO standard or higher in the context of cold deformation, for example a 35B2 alloy. The so formed fastener elements 12 are suitable amongst other things for all commercially available steel materials for drawing quality sheet metal parts and also for aluminum or its alloys. Also aluminum alloys, in particular those with higher strength can be used for the elements, for example AlMg5. Moreover higher strength magnesium alloys such as for example AM50 can also be used for the elements 12.

The invention claimed is:

1. A functional element (12) being one of a rivet element and a press-in element, the functional element having a shaft part (14), a head part (16), an annular sheet metal contact surface (20, 24) which surrounds the shaft part, and a plurality of uniformly distributed features (32) providing security against rotation which are provided at the annular sheet metal contact surface (20, 24), each feature (32) providing security against rotation consisting of a recess (31) having a boundary (37) provided in the sheet metal contact surface (20, 24) of the functional element (12) and of a raised portion (33) having the shape of an elongate rib and a rounded apex and being arranged substantially centrally in the likewise elongate recess (31), wherein the recess (31) surrounds the raised portion (33) in the shape of a horseshoe, an end of the horseshoe directed away from the shaft part (14) splitting into two regions directed toward the shaft part (14) on both sides of the rib-like raised portion (33), the annular sheet metal contact surface (20, 24) lying in a local plane (E) in a region of and around the features (32) providing security against rotation and the volume of the raised portion (33) projecting beyond this local plane (E) or one side thereof substantially corresponding to the volume of the recess (31) at the other side of the plane (E).

2. The functional element (12) in accordance with claim 1, wherein the boundary (37) of the recess (33) is one of rounded and sharp-edged.

3. The functional element (12) in accordance with claim 1, wherein the rib-like raised portion (33) stands substantially radially to a central longitudinal axis (30) and starts from a cylindrical regions of the functional element (12).

4. The functional element (12) in accordance with claim 1, wherein the functional element has a rivet section (22) which ensures the form-fitted engagement of each feature (32) of the functional element (12) providing security against rotation of the functional element (12) with a sheet metal part (10).

5. The functional element (12) in accordance with claim 1, wherein the functional element is a press-in element having an undercut which receives sheet metal material which secures the form-fitted engagement of each feature providing security against rotation of the functional element in the sheet metal part.

6. A component assembly consisting of a functional element (12) in accordance with claim 1 and a sheet metal part (10), with the sheet metal material adjacent to the sheet metal contact surface (20, 24) having a material recess at the position of each raised portion (32) of a features providing security against rotation (32) and a raised material portion at the position of each recess (31), whereby a form-fitted engagement bringing about the security against rotation arises between the material of the sheet metal part and the functional element.

7. The component assembly in accordance with claim 6, the functional element (12) being a rivet element having a rivet section (22), wherein after being beaded over the rivet section (22) clamps the sheet metal material between itself and the sheet metal contact surface (20, 24).

8. The component assembly in accordance with claim 6, the functional element (12) being a press-in element having an undercut and the sheet metal material being at least partly received in the undercut thus preventing an axial separation of the functional element and the sheet metal part.

9. A functional element (12) having a longitudinal axis (30), a shaft part (14), a head part (16), an annular sheet metal contact surface (20, 24) which surrounds the shaft part, and a plurality of uniformly distributed features (32) providing security against rotation which are provided at the annular sheet metal contact surface (20, 24), the features (32) providing security against rotation being adapted to engage a sheet metal part only by movement in the direction of the longitudinal axis (30), each feature (32) providing security against rotation consisting of a recess (31) having a boundary (37) provided in the sheet metal contact surface (20, 24) of the functional element (12) and of a raised portion (33) having the shape of an elongate rib and a rounded apex and being arranged substantially centrally in the likewise elongate recess (31), wherein the recess (31) surrounds the raised portion (33) in the shape of a horseshoe, an end of the horseshoe directed away from the shaft part (14) splitting into two regions directed toward the shaft part (14) on both sides of the rib-like raised portion (33), the annular sheet metal contact surface (20, 24) lying in a local plane (E) in a region of and around the features (32) providing security against rotation and the volume of the raised portion (33) projecting beyond this local plane (E) or one side thereof substantially corresponding to the volume of the recess (31) at the other side of the plane (E).

* * * * *